United States Patent [19]

Kubota et al.

[11] Patent Number: 5,170,467
[45] Date of Patent: Dec. 8, 1992

[54] METHOD OF PRINTING LEAFLETS, CATALOGS OR THE LIKE

[75] Inventors: Yasuo Kubota; Shinichi Hikosaka; Shigekazu Ohki; Toshio Modegi; Yasunori Tomoda, all of Tokyo, Japan

[73] Assignee: Dai Nippon Insatsu Kabushiki Kaisha, Japan

[21] Appl. No.: 704,730
[22] PCT Filed: Jul. 29, 1986
[86] PCT No.: PCT/JP86/00397
    § 371 Date: Apr. 22, 1987
    § 102(e) Date: Apr. 22, 1987
[87] PCT Pub. No.: WO87/00940
    PCT Pub. Date: Feb. 12, 1987

Related U.S. Application Data

[63] Continuation of Ser. No. 325,041, Mar. 16, 1989, abandoned, which is a continuation of Ser. No. 32,454, Apr. 22, 1987, abandoned.

[30] Foreign Application Priority Data

| Jul. 29, 1985 | [JP] | Japan | 60-166985 |
| Jul. 29, 1985 | [JP] | Japan | 60-166986 |
| Aug. 22, 1985 | [JP] | Japan | 60-184851 |
| Aug. 22, 1985 | [JP] | Japan | 60-184852 |
| Aug. 22, 1985 | [JP] | Japan | 60-184854 |
| Aug. 22, 1985 | [JP] | Japan | 60-184855 |

[51] Int. Cl.⁵ .................................... G03F 1/00
[52] U.S. Cl. ........................... 395/148; 395/161
[58] Field of Search ............... 364/518, 521; 340/701, 340/721, 722, 731; 395/144-148, 155, 161

[56] References Cited

U.S. PATENT DOCUMENTS

| 3,968,501 | 7/1976 | Gilbert | 354/7 |
| 4,044,363 | 8/1977 | Morgan | 354/5 |
| 4,067,022 | 1/1978 | Ebner | 354/7 |
| 4,069,511 | 1/1978 | Lelke | 364/200 |
| 4,119,977 | 10/1978 | Moyroud | 354/7 |
| 4,121,228 | 10/1978 | Cowe et al. | 354/7 |
| 4,204,206 | 5/1980 | Bakula et al. | 340/721 |
| 4,231,096 | 10/1980 | Hansen et al. | 340/748 X |
| 4,496,989 | 1/1985 | Hirosawa | 358/296 |
| 4,555,775 | 11/1985 | Pike | 364/900 |
| 4,581,710 | 4/1986 | Hasselmeier | 364/523 |
| 4,628,366 | 12/1986 | Yamada | 358/280 |
| 4,633,328 | 12/1986 | Saito et al. | 358/296 |
| 4,656,504 | 4/1987 | Hirosawa | 358/75 |
| 4,667,248 | 5/1987 | Kanno | 358/280 |
| 4,672,462 | 6/1987 | Yamada | 358/280 |
| 4,675,743 | 6/1987 | Riseman et al. | 358/263 |
| 4,675,833 | 6/1987 | Cheek et al. | 364/523 |
| 4,679,153 | 7/1987 | Robinson et al. | 364/523 |
| 4,683,500 | 7/1987 | Kitamura et al. | 358/280 |
| 4,691,238 | 9/1987 | Yamada | 358/380 |
| 4,713,754 | 12/1987 | Agarwal et al. | 364/200 |
| 4,721,951 | 1/1988 | Holler | 340/701 |
| 4,733,304 | 3/1988 | Homma et al. | 358/280 |
| 4,736,310 | 4/1988 | Colthorpe et al. | 364/526 |
| 4,745,561 | 5/1988 | Hirosawa et al. | 364/523 |

FOREIGN PATENT DOCUMENTS

2116407  9/1983  United Kingdom.

Primary Examiner—Heather R. Herndon
Attorney, Agent, or Firm—Parkhurst, Wendel & Rossi

[57] ABSTRACT

A method of preparing printing plates for printing leaflets, catalogs or the like using a computer. The design for a leaflet, a catalog or the like is classified into line drawings, photographs and characters and they are introduced into a computer through predetermined input units, respectively. Then, they are laid out while being displayed on a display and how they have been laid out is confirmed by the hard copy. The press plates for printing are prepared on the basis of data output from the computer. Additionally, a method of laying out line drawings, photographs and characters on a display with high efficiency. The line drawings are laid out by designating the size and the angle of the line drawing to be laid out on a display in an analog fashion. The photographs are laid out by displaying only the contour line of the photograph on the display. The characters are laid out by outputting data delivered to a block copy for line drawings and a phototype setter on the basis of the layout of the characters on the display. Further a method of designating a color on a display with high efficiency. The density ratios of respective reference colors are designated on a display in an analog fashion. Thus, a color obtained by mixing the designated respective reference colors is displayed on the display.

3 Claims, 12 Drawing Sheets

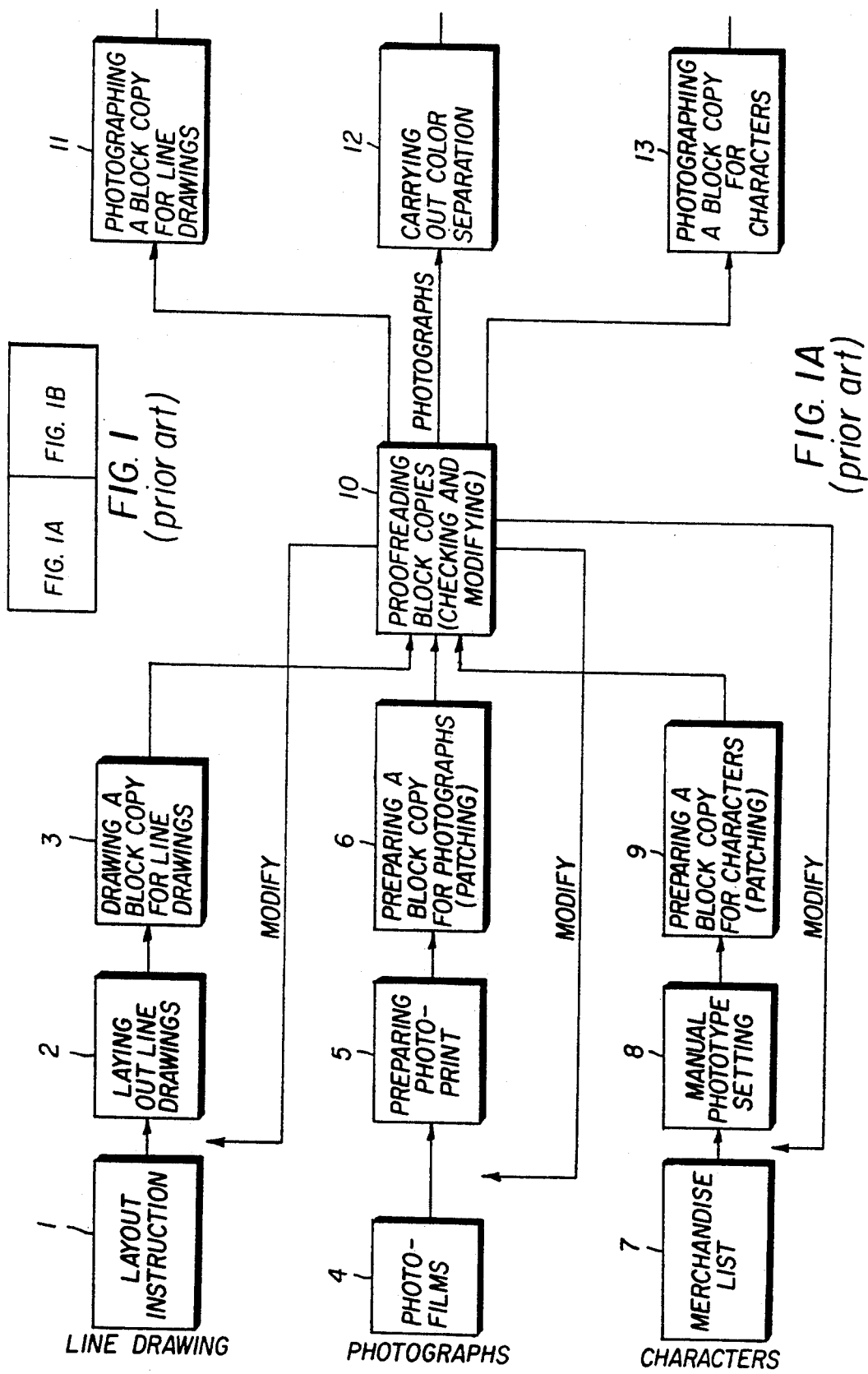
FIG. I (prior art)
FIG. IA (prior art)

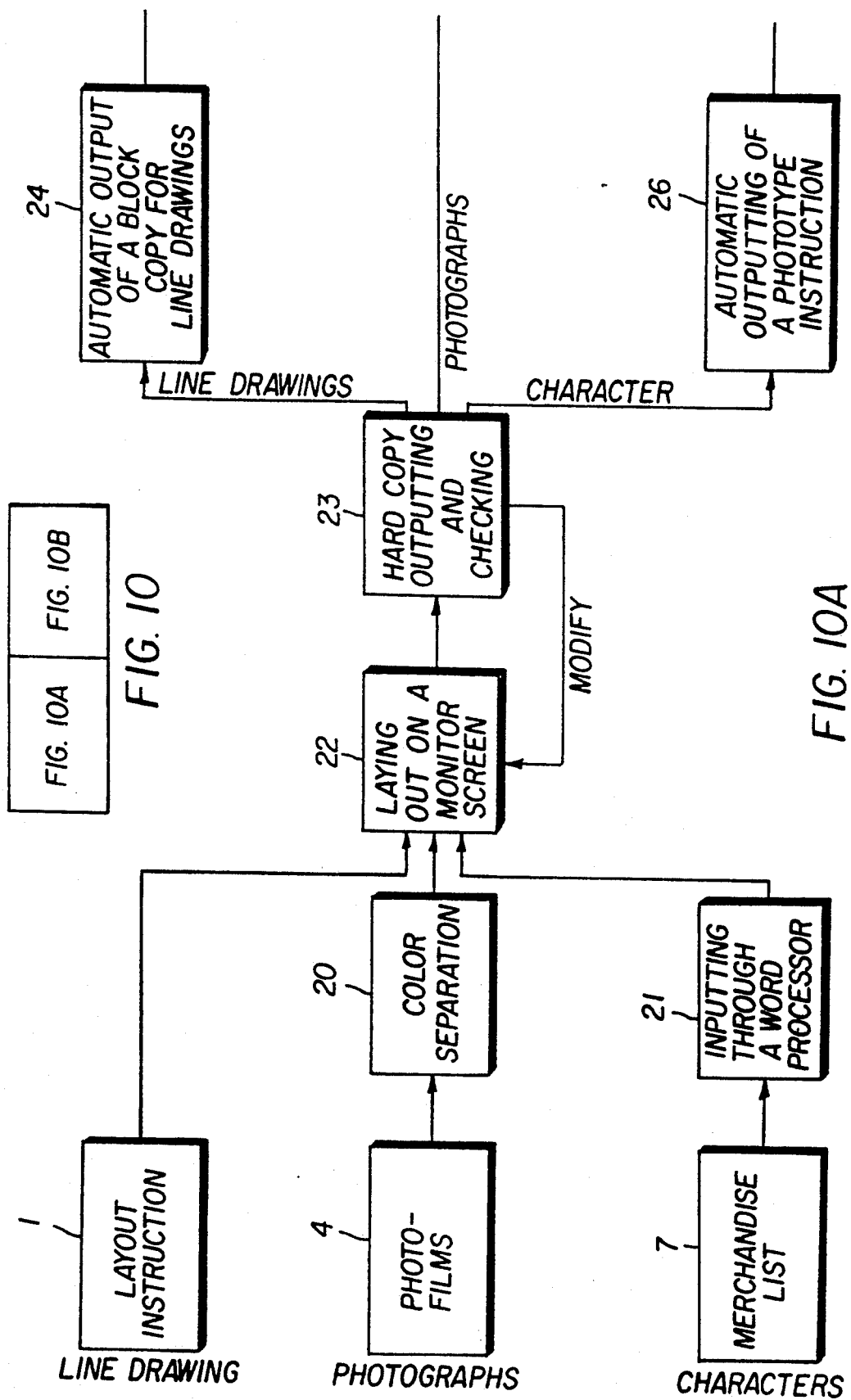

| NO. | CHARACTER CODE | POSITION | SIZE | TYPE STYLE | SPACE BETWEEN CHARACTERS | DISTORTION RATIO | | | ROTATION | COLOR |
|---|---|---|---|---|---|---|---|---|---|---|
| | | | | | | OBLIQUE STYLE | ELONGATED STYLE | FLAT STYLE | | |
FIG. 19
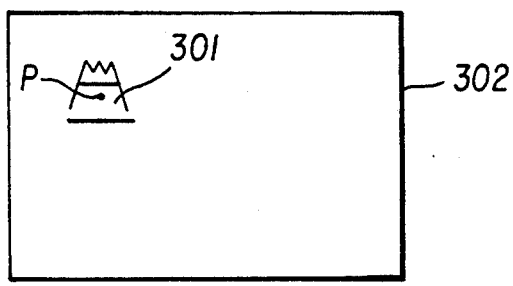
FIG. 20(a)
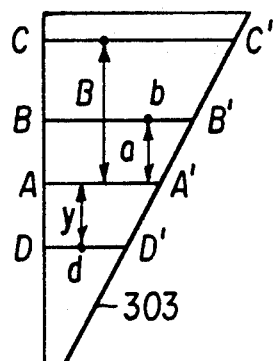
FIG. 20(b)
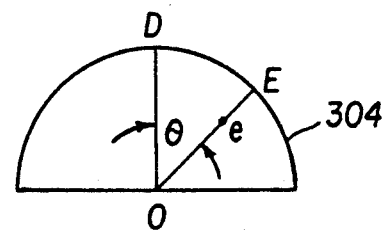
FIG. 20(c)

METHOD OF PRINTING LEAFLETS, CATALOGS OR THE LIKE

This is a continuation of application Ser. No. 07/325,041 filed Mar. 16, 1989, now abandoned, which is also a continuation of Ser. No. 07/032,454 filed Apr. 22, 1987, now abandoned.

DESCRIPTION

1. Technical Field

The present invention relates to a method printing leaflets, catalogs or the like, and more particularly to a method of printing leaflets, catalogs or the like which prepares printing plates using a computer.

2. Background Art

On predetermined positions of leaflets, catalogs or the like, there are arranged in general a photograph showing the appearance of goods, the trade name, the model number, the price, its explanatory view, a border and the like. For this reason, designs of leaflets, catalogs or the like are ordinarily handled with each being classified into line drawings, photographs and characters in the process for printing these leaflets, catalogs or the like. A diagrammatical view of a working process for leaflets which has been generally carried out in the art is shown in FIG. 1. It is now assumed that the printing of a leaflet as shown in FIG. 2 is conducted. First, a designer effects laying out line drawings 2 on the basis of a layout instruction 1 from a person who has given an order. Thus, the entire composition as shown in FIG. 2 is roughly determined. Then, drawing a block copy for line drawings 3 is carried out on the basis of the line drawings thus laid out. The border, rules, character position designating lines etc. which can be handled as line drawings as shown in FIG. 3 are extracted and they are described on the block copy for line drawings. With respect to the photographic portions of the goods, preparing photo-print 5 which expands or reduces photo-films 4 so that they have a predetermined size is carried out. The photo-printed films are patched along contour lines of the goods. Thus, preparing a block copy for photographs 6 is conducted and a block copy for photographs as shown in FIG. 4 is obtained. In addition, with respect to the characters such as the trade name or the price, a manual phototype setting 8 is conducted using a phototype setter on the basis of a merchandise list 7, thereby to print out characters. By patching these characters thus printed out, preparing a block copy for characters 9 is carried out and a block copy for characters as shown in FIG. 5 is obtained.

Then, on the block copy for line drawings shown in FIG. 3, the block copy for photographs shown in FIG. 4 and the block copy for characters shown in FIG. 5 are stacked, thus to complete the design as shown in FIG. 2 to carry out proofreading block films. If modification is required, the block copies for line drawings, photographs and characters are prepared for a second time. When the proofreading of the block copies is completed, preparing assembled films 16 will be conducted on the basis of these block copies. At this time, for block copies for line drawings, photographs and characters, different processes are carried out, respectively. First, with respect to the block copy for line drawings, photographing a block copy for line drawings 11 is conducted, and a negative plate in respect to the line drawings as shown in FIG. 6 is made up. With respect to the block copy for photographs, the block copy for photographs itself is not subjected to photographing as it is, but the original photo-films 4 are subjected to color separation 12. Then, by patching these color-separated photo-films, separation films 14 are prepared. When carrying out color separation, by using filters of yellow (Y), magenta (M), cyanogen (C) and black ($B_L$), separation films with respect to Y, M, C and $B_L$ are prepared as shown in FIG. 7. In addition, with respect to the block copy for characters, photographing a block copy for characters 13 is carried out in the same manner as the block copy for line drawings. Thus, a negative plate relating to characters as shown in FIG. 8, is prepared, and at the same time preparing a mask is carried out. This mask serves to cover a portion of separation films etc. and is formed, for example, as shown in FIG. 9. The set of the negative plate 5, the separation films and the mask is used as assembled films.

Then, these assembled films are used to prepare press plates and carry out their proofing 17. When needed according to the result, modifying assembled films 18 is made. After the modification is completed, printing 19 is to be carried out.

However, the above-described conventional printing method greatly depends upon the manual working, resulting in the drawback that the burden on the work is very heavy when modification is made. Particularly in leaflets, catalogs or the like, it often happens that a number of modifications of layout are made and the price often changes immediately before the printing process, resulting in very poor working efficiency. For instance, when modification is made at the stage of proofreading of block copies, block copies for line drawings, photographs and characters must be manually prepared again. It has been desired for a long time to provide a printing method having a higher efficiency.

DISCLOSURE OF INVENTION

A first object of the present invention is to provide a method of printing leaflets, catalogs or the like which can easily make modification at an intermediate stage, thus realizing a high efficiency printing.

A second object of the present invention is to provide a method of laying out photographs having a high efficiency used for printing leaflets, catalogs or the like.

A third object of the present invention is to provide a method of laying out characters having a high efficiency used for printing leaflets, catalogs or the like.

A fourth object of the present invention is to provide a method of laying out figures having a high efficiency used for printing leaflets, catalogs or the like.

A fifth object of the present invention is to provide a method of designating colors having a high efficiency used for printing leaflets, catalogs or the like.

To achieve the above-mentioned objects, the present invention is constituted as featured below.

The first feature of the present invention resides in a method of printing leaflets, catalogs or the like comprising the steps of: classifying a design for a leaflet, a catalog or the like to be printed into line drawings, photographs and characters; independently inputting data indicative of line drawings, photographs and characters which have been classified to a computer; allowing the computer to prepare a composite design of these data to output the composite design; editing the respective data on the basis of the output result; preparing a block copy for line drawings on the basis of the edited data indicative of line drawings; outputting color-separated films on the basis of the edited photographic data; preparing separation films by patching these color separated films; preparing a block copy for characters on the basis of the edited character data; preparing assembled films on the basis of the block copy for line drawings, the separation films and the block copy for characters; preparing press plates and proofing using the assembled films; and carrying out printing after proofing has been completed, thus making it possible to easily make a modification at an intermediate stage to realize a high efficiency printing.

The second feature of the present invention resides in a method of printing leaflets, catalogs or the like comprising the steps of: classifying a design for a leaflet, a catalog or the like to be printed into line drawings, photographs and characters; independently inputting data indicative of line drawings, photographs and characters which have been classified to a computer; allowing the computer to prepare a composite design of the respective data to output the composite design; preparing first separation films on the basis of the edited photographic data; preparing second separation films on the basis of the edited data indicative of line drawings and characters; preparing press plates and proofing using the first and second separation films; and carrying out printing after proofing has been completed, thus making it possible to easily make a modification at an intermediate stage to realize a high efficiency printing.

The third feature of the present invention resides in a method of laying out photographs used for leaflets, catalogs or the like comprising the steps of: introducing a photograph to be laid out into a memory unit as digital data; trimming said photograph thus introduced on a graphic display; displaying only the contour line of the photograph which has undergone trimming on the graphic display to lay out said photograph; and outputting an image on the graphic display after laying out said photograph has been completed in a manner that pixels within the contour lines are represented, thus carrying out a layout by high response interactive input, enabling a high efficiency layout.

The fourth feature of the present invention resides in a method of laying out characters used for leaflets, catalogs or the like comprising the steps of: introducing a character to be laid out into a memory unit as digital data; displaying the character thus introduced on a graphic display to lay it out; outputting a hard copy of an image on the graphic display after layout has been completed to execute proofreading; and outputting data delivered to a block copy for line drawings and a phototype setter on the basis of the layout information, thus carrying out a layout by an interactive input to enable a high efficiency layout.

The fifth feature of the present invention resides in a method to use a coordinate input unit as input means to lay out a figure at a predetermined position on a graphic display so that it has a predetermined size and makes a predetermined angle, the method comprising the steps of providing a closed area for designation of position corresponding to an image on the graphic display in the coordinate system of the coordinate input unit to designate a point within the position designation area to determine a layout position, and providing a closed area for designation of size and a size reference line dividing the size designation closed area into two closed areas to designate a point within the size designation closed area to determine the size at the layout in accordance with a distance between the designated point and the size reference line, thus enabling a layout having a good operability.

The sixth feature of the present invention resides in a method to use a coordinate input unit as input means to lay out a figure at a predetermined position on a graphic display so that it has a predetermined size and makes a predetermined angle, the method comprising the steps of providing a closed area for designation of position corresponding to an image on the graphic display in the coordinate system of the coordinate input unit to designate a point within the position designation area to determine a layout position, and providing a closed area for designation of angle, an origin, and an angular reference line passing through the origin in the coordinate system of the coordinate input unit to designate a point within the angle designation closed area to determine a layout angle in accordance with an angle defined by a straight line connecting the designated point to the origin and the angular reference line, thus enabling a layout having a good operability.

The seventh feature of the present invention resides in a color designation method to represent a color on a display as mixture of n reference colors, the method comprising the steps of providing n reference color display areas and a single designated color display area on the display, designating a point within each reference color display area using a coordinate input unit thereby to designate density ratios of the respective reference colors, color-displaying portions corresponding to the density ratio among respective reference color display areas using respective reference colors, and color-displaying the designated color display area using a designated color obtained by mixing reference colors in accordance with the density ratios, thus making it possible to easily confirm an actual color tone to realize color designation having good operability.

BRIEF DESCRIPTION OF THE DRAWINGS

FIG. 19 is a view showing one example of a layout table used for carrying out the method of laying out characters shown in FIG. 17;

FIGS. 20(a) to 20(c) are explanatory views for a position designation operation, a size designation operation and angle designation operation in the method of laying out figures according to the present invention, respectively;

BEST MODE FOR CARRYING OUT THE INVENTION

The present invention will be explained on the basis of embodiments shown.

One Embodiment Relating to the Printing Method

Figure 1B:
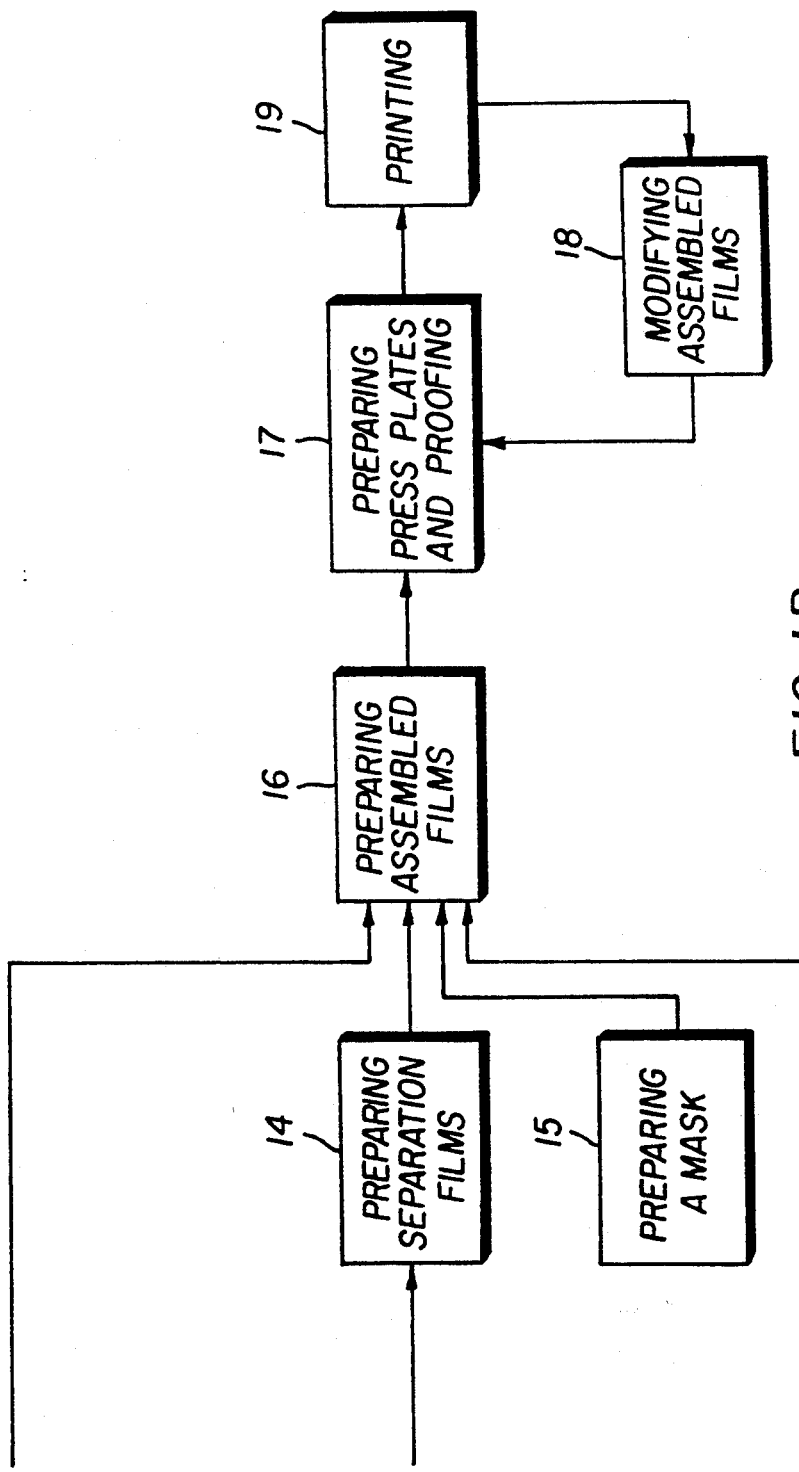
FIG. 1 is a process diagram for a conventional leaflet printing work.
Figure 2:
FIG. 2 is an explanatory view showing one example of a leaflet to be prepared.
Figure 10B:
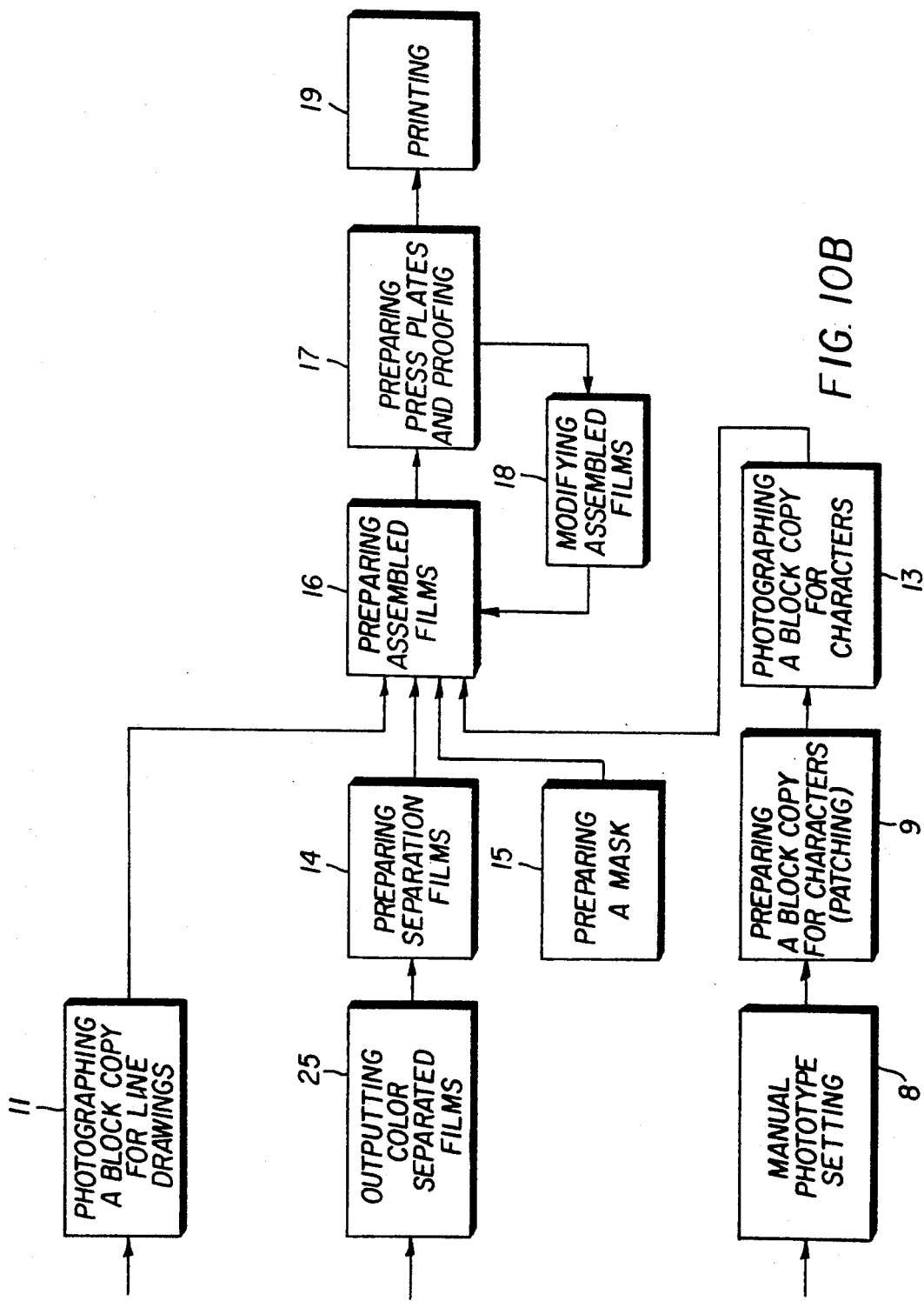
FIG. 10 is a process diagram for a leaflet printing work according to an embodiment of the present invention.

FIG. 10 is a process diagram for a leaflet printing work according to the present invention. The same processes as those in the process diagram shown in FIG. 1 are designated by the same symbols, respectively. It is now assumed that the printing of a leaflet as shown in FIG. 2 is conducted. The layout instruction 1 in regard to line drawings, the photo-films 4 in regard to photographs, and the merchandise list 7 in regard to characters are given by a person who has given an order in the same manner as in the conventional process. Respective data indicative of line drawings, photographs and characters are independently input into a computer on the basis of these contents and are subjected to composition therewith. This process is a process 22 for laying out on a monitor screen. The data in regard to line drawings given by the layout instruction 1 may be input, for example, by designating two-dimensional coordinates using an input unit such as a keyboard, a tablet or mouse while observing a display unit of the computer. The data in regard to photographs are introduced into the computer after subjected to color separation 20 in regard to photofilms 4. For example, color separation with respect to three colors of R (Red), G (Green) and B (Blue) may be conducted to take them in as raster data, respectively. In addition, the data in regard to characters is in advance subjected to be input through a word processor 21 on the basis of the merchandise list 7. Namely, a table in regard to the trade name, the description and the price is caused to be memorized into a memory unit of the computer through the word processor. At the process for laying out on a monitor screen, these respective data are composed to display the composite data on the display to carry out layout and modification. For example, data indicative of line drawings are displayed on the screen of a color monitor as a display to display images of respective goods by making use of photographic data taken in by the color separation 20. Since image displaying by computer is conducted, it is possible to easily modify respective layouts using a tablet, etc. Then, the merchandise list which has been already introduced into the computer is retrieved to display character data indicative of the trade name, the price or the like at predetermined positions. As a result, an image as shown in FIG. 2 is obtained on the color monitor screen.

When the final laying out work is completed, a hard copy of the image obtained is prepared to check the image thus output 23. This process corresponds to the process for proofreading block copies in the conventional method shown in FIG. 1. With the conventional method, it was required to prepare block copies for line drawings, photographs and characters by the time this stage was reached. In contrast, the method according to the present invention does not require any block copy and all data are preserved in the memory unit of the computer. Accordingly, labor required by the time this stage is reached is lessened to a great extent. In addition, since the result is obtained as a color hard copy, the person who has given an order can perform checking while observing an image having substantially the same quality as that of the completed leaflet. When there occurs a need to make modification at the stage of this checking, it is sufficient to repeat the process for laying out on a monitor screen 22 for a second time. Accordingly, it is unnecessary to prepare block copies again as in the prior art, but it is enough only to output a hard copy after a predetermined modification inputting has been executed while observing the color monitor screen. As understood from the foregoing description, the advantageous feature of this embodiment resides in that it is possible to proceed the process for laying out on a monitor screen in an interactive form while always observing the monitor screen, and it is further possible to confirm an image prepared on a monitor screen by a hard copy of the image.

Figure 6:
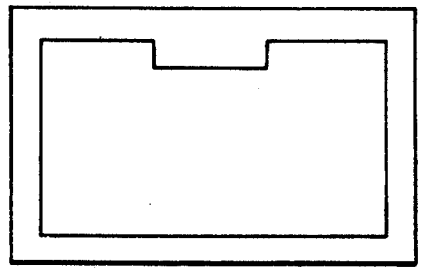
FIG. 6 is an explanatory view for a negative plate in regard to line drawings.
Figure 3:
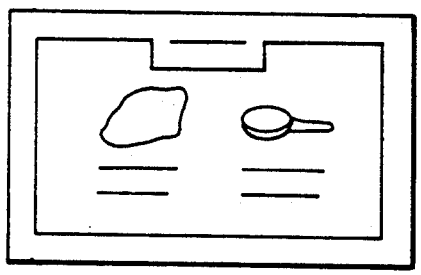
FIG. 3 is an explanatory view showing a block copy for line drawings.

Upon completion of checking the output image, a printing process is advanced on the basis of this image. First, with respect to line drawings, a block copy for line drawings is prepared. This is accomplished by carrying out an automatic outputting of a block copy for line drawings 24 from the computer. For instance, when data indicative of line drawings are output to an XY plotter, a block copy for line drawings is automatically drafted. This completely eliminates the necessity of manually making a drafting as required in the prior art. When the block copy for line drawings has been prepared, photographing a block copy for line drawings 11 is carried out in the same manner as in the conventional method. Thus, a negative plate for line drawings as shown in FIG. 6 is prepared.

For photographs, it is required to prepare separation films. In this case, since the data which have been already subjected to color separation are introduced into the computer, it is sufficient to carry out a color separated film outputting 25 to output these data from the computer to patch them, thus to prepare separation films 14.

Figure 8:
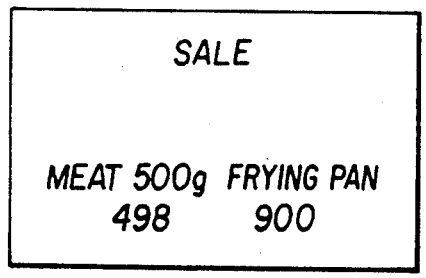
FIG. 8 is an explanatory view for a negative plate in regard to characters.
Figure 5:
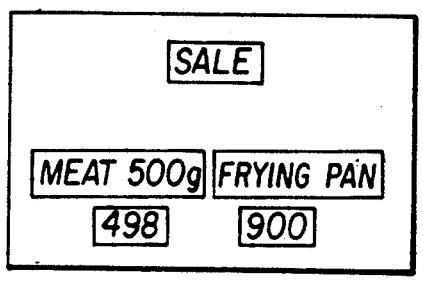
FIG. 5 is an explanatory view showing a block copy for characters.
Figure 9:
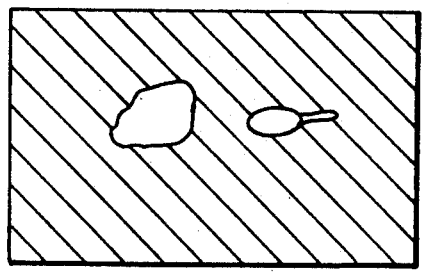
FIG. 9 is an explanatory view for a mask plate.

In addition, with respect to characters, first is to carry out a phototype instruction automatic outputting 26. This process is a process to print out, using a printer etc., required character trains extracted from the merchandise list in the computer, in which character size, style of type etc. are designated. On the basis of the phototype instruction thus output, an operator effects a manual phototype setting 8. In the prior art, an operator selects necessary data while observing the merchandise list 7 to effect the manual phototype setting 8. In contrast, in accordance with this invention, it is sufficient to carry out a phototype setting as required by the phototype instruction, with the result that the burden on the operator is lessened. By patching characters printed out, preparing a block copy for characters 9 is conducted. Then, photographing a block copy for characters 13 is carried out. Thus, a negative plate in regard to characters as shown in FIG. 8 is prepared. In addition, preparing a mask 15 is carried out at the same time in the same manner as in the prior art.

The set of the negative plates, the separation films and the mask which have been prepared in this way serves as assembled films. Thus, the process for preparing assembled films is completed. Subsequent to this process, preparing press plates and proofing 17 is conducted in the same manner as in the conventional process. If modification is required, modifying assembled films 18 is carried out. After the modifying process has been completed, printing 19 is conducted.

As stated above, a method of printing leaflets, catalogs or the like according to this embodiment is characterized by inputting a design for a leaflet, a catalog or the like to be printed to a computer with the design being classified into line drawings, photographs and characters to compose them on the computer to make a necessary modification to prepare assembled films on the basis of the output data from the computer. This can easily make modification at the middle stage to provide a high efficiency printing.

Another Embodiment Relating to the Printing Method

Figure 11:
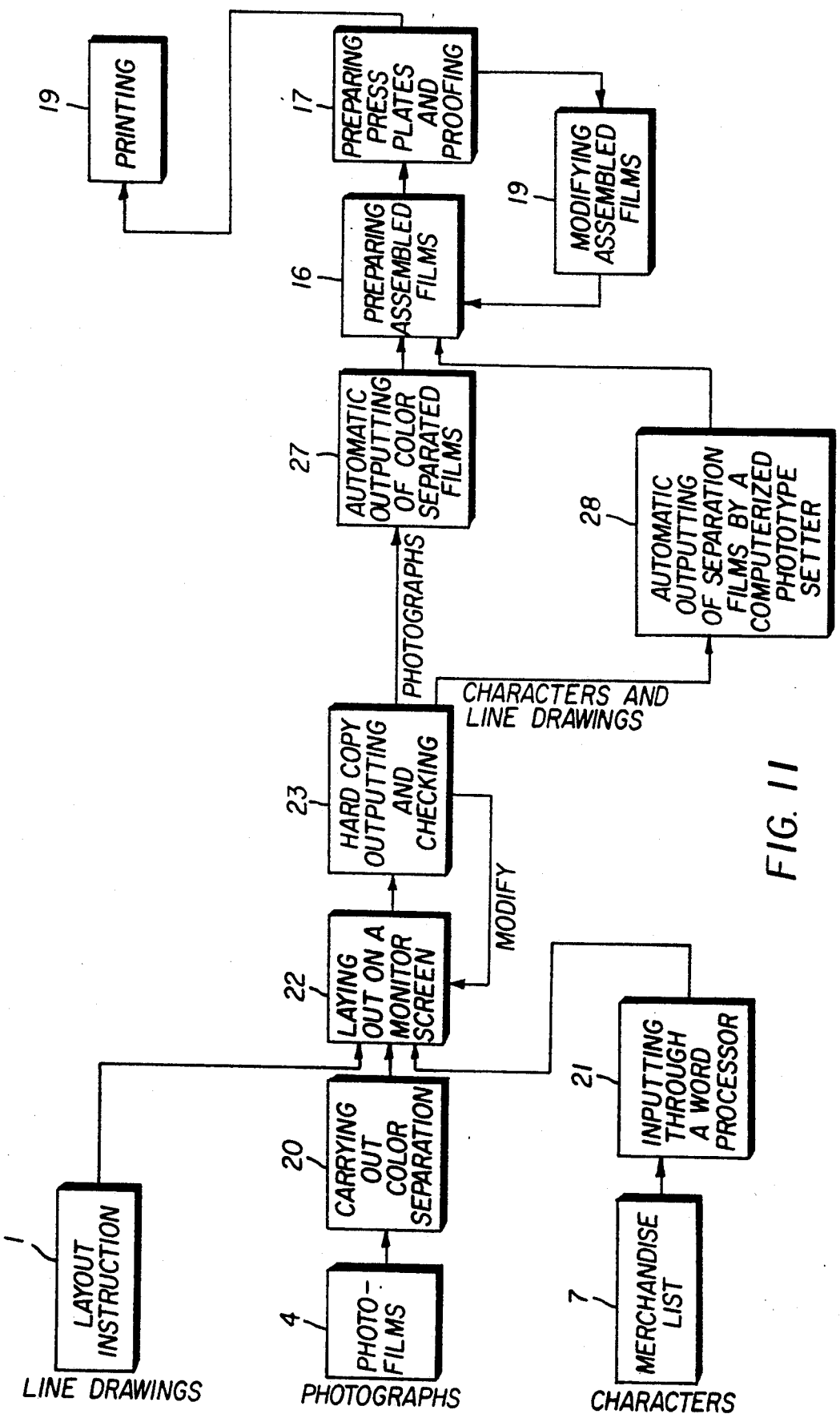
FIG. 11 is a process diagram for a leaflet printing work according to another embodiment of the present invention.

FIG. 11 is a process diagram for a different leaflet printing work according to the present invention. This working process is more efficient than the working process shown in FIG. 10. Namely, the processes up to the process for checking an output image 23 are the same as those shown in FIG. 10, but the subsequent processes are improved so that they considerably become efficient. The processes subsequent to the process for checking an output image 23 will be now explained.

Figure 7:
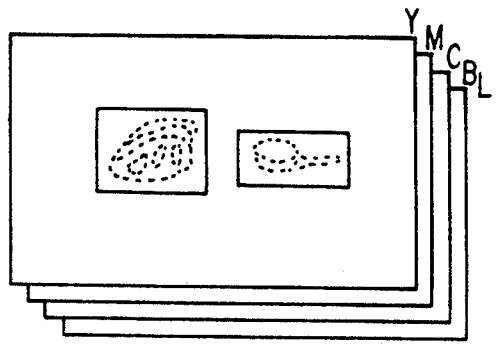
FIG. 7 is an explanatory view for separation films (which are prepared at a process for separation films 14 in the working process in FIG. 10, and at a process for a separation film automatic output 27 in the working process in FIG. 11)
Figure 4:
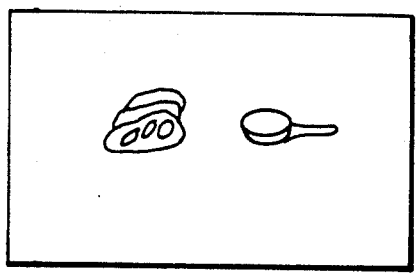
FIG. 4 is an explanatory view showing a block copy for photographs.

Upon completion of the output image checking 23, the printing process advances on the basis of the image. Namely, first is to execute the process for preparing assembled films 16. Since data indicative of line drawings, photographs and characters are all memorized in the computer, the process for preparing assembled films 16 is implemented by making use of these data. Accordingly, there is no need to prepare respective block copies to effect photographing them as in the working process shown in FIG. 10. With respect to photographs, automatic outputting of color separated films 27 is carried out. By using the computer, separation films as shown in FIG. 7 are automatically prepared. Since data related to respective photographs have been already input in the memory unit of the computer at the process for color separation and data related to layout positions of respective photographs are also delivered to the computer, a separation film output device is connected, thereby making it possible to automatically prepare separation films.

On the other hand, with respect to line drawings and characters, automatic outputting of separation films by a computerized phototype setter 28 is carried out. By using the computerized phototype setter which is connected to the computer, separation films such that line drawings in FIG. 6 and characters in FIG. 8 are superimposed are automatically prepared. This is accomplished by inputting character codes for characters and line drawing vector data for line drawings to the computerized phototype setter.

Preparing assembled films 16 is thus conducted. Accordingly, this completely eliminates the necessity of photographing respective block copies or carrying out manual phototype setting as in the working process shown in FIG. 10. Subsequent to this, the process for preparing press plates and proofing is conducted in the same manner as the working step shown in FIG. 10. If modification is required, the process for modifying assembled films 18 is executed. After the modification has been completed, the printing process 19 is conducted.

As stated above, a method of printing leaflets, catalogs or the like according to this embodiment is characterized by inputting a design for a leaflet, a catalog or the like to be printed to a computer with the design being classified into line drawings, photographs and characters to compose them on the computer to make a necessary modification to automatically prepare assembled films on the basis of the output data from the computer. This can easily make modification at the middle stage and eliminates the necessity of preparing respective block copies, thus making it possible to provide a high efficiency printing.

An Embodiment for Carrying Out a Method of Laying Out Photographs

In the two working processes which have been described above as the best mode relating to the printing method, both carry out the layout of line drawings, photographs and character on a display at the process for laying out on a monitor screen to obtain a hard copy of the display screen at the process 23 to conduct studying thereof. In leaflets, catalogs or the like, photographs showing the appearance of goods, trade name, model number, price, explanatory views, borders etc. are generally disposed at predetermined positions. In recent years, according as CAD (Computer Aided Design) has been developed, various attempts to carry out such a layout using a computer are made. However, with respect to the layout of photographs, since the photograph is dealt as raster data representing it as the set of infinitesimal pixels, there are drawbacks of a large capacity of data, low response of interactive input and poor operability.

Figure 12:
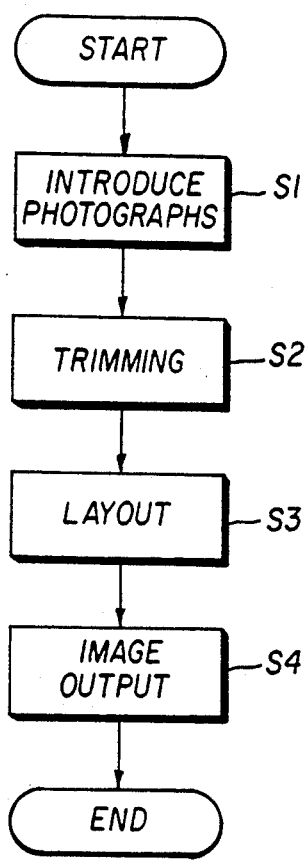
FIG. 12 is a flowchart showing a method of laying out photographs according to the present invention.
Figure 13:
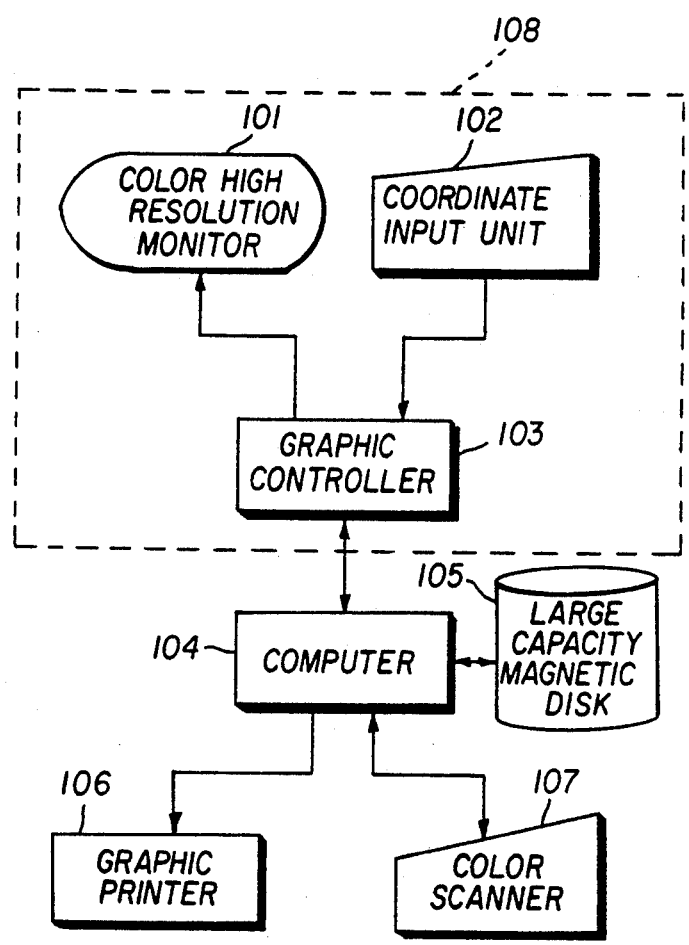
FIG. 13 is a block diagram illustrating an embodiment of an arrangement of a layout device for carrying out the method of laying out photographs shown in FIG. 12.

An embodiment which will be described in detail below provides a method of laying out photographs which has solved such problems and can lay out photographs with high efficiency using a computer. FIG. 12 is a flowchart showing a laying out method according to this embodiment, and FIG. 13 is a block diagram showing an arrangement of an embodiment of a layout device for carrying out this method. First is to introduce photographs subject to laying out into a memory unit as digital data at step S1. This step corresponds to the process for color separation 20 in FIGS. 10 and 11, and may be executed by separating, using a color scanner 107, a photograph into cyanogen (C), magenta (M), yellow (Y) and black ($B_L$) as shown in FIG. 13 to represent them, e.g., as a digitalized quantity of 256 color tones, thus causing it to be memorized into a large capacity magnetic disk 105 through a computer 104. When the color scanner 107 and the computer 104 are directly coupled, the digitalized data can be stored directly into the large capacity magnetic disk 105 in accordance with on-line system. On the other hand, even when the scanner 107 and the computer 104 are not directly coupled, there may be conducted such an operation to load a magnetic tape which has undergone recording processing by the scanner 107 on the computer 104 to transfer data to the large capacity magnetic disk 105.

Figure 14A:
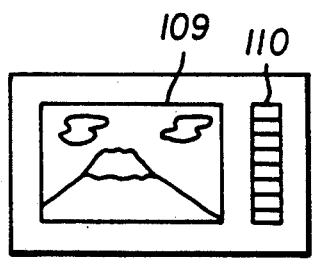
FIGS. 14(a) to (e) are views of display screens showing the layout conditions by the method of laying out photographs shown in FIG. 12, respectively.
Figure 14B:
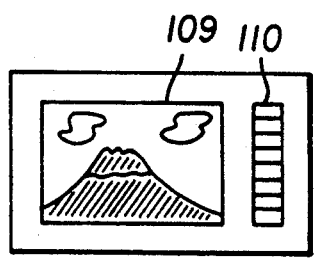
Figure 14C:
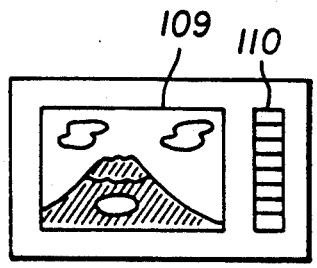

Next is to effect trimming of the photograph taken in at step S2. This step S2 and a step S3 which will be described later correspond to the process for laying out on a monitor screen in FIGS. 10 and 11. This trimming operation is carried out on a graphic display. For instance, in the device shown in FIG. 13, trimming work is executed by an interactive type input device 108 composed of a color high resolution monitor 101, a coordinate input unit 102 and a graphic controller 103. Namely, photographic data memorized in the large capacity magnetic disk 105 is displayed on the color high resolution monitor 101. An operator inputs an instruction of trimming from the coordinate input unit 102 while observing the image displayed on the monitor 101. The photographic data which have been subjected to trimming are stored into the large capacity magnetic disk 105 for a second time. Actual examples of the trimming operation on the high resolution monitor 101 are shown in FIGS. 14(a) to 14(c). First, as shown in FIG. 14(a), the photograph taken in the large capacity magnetic disk 105 is displayed on the monitor screen. At the side of an image 109, an operation menu panel 110 is displayed. Inputting operation is effected by the coordinate input unit 102. A cursor is displayed at a position on the monitor screen corresponding to coordinates designated by the coordinate input unit 102. By moving this cursor, the trimming operation is carried out. For example, when there is a need to apply trimming to only the mountain portion (hatched portion) to take it out as shown in FIG. 14(b), it is sufficient to move the cursor in a manner to trace the thick line portions. Such a trimming may be effected not only by the method of carrying out trimming along contour lines but also by a method of providing opening portion inside thereof as shown in FIG. 14(c). In addition, by selecting a particular function from the operation menu panel 110, other trimming operations except for the trimming based on the movement of the cursor may be also possible. For instance, an elliptic function may be selected to designate positions of the central point and end points to form an elliptic opening, or a rectangular function may be selected to designate two points on a diagonal line to form a rectangular opening (in such a case, an elliptic or rectangular frame may be utilized as a contour line). After trimming has been made in this way, data indicative of opening lines (coordinate data of the thick line portions in FIG. 14(b) and the photographic data which has undergone trimming (data of hatched portions in FIG. 14(b)) are independently memorized into the large capacity magnetic disk 105.

Figure 14D:
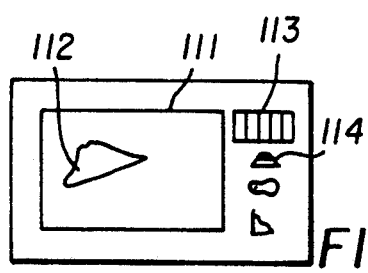
Figure 14E:
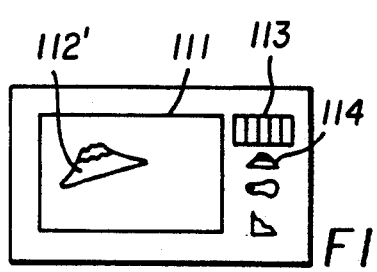

Then, the layout of the photograph having been subjected to trimming is made on the monitor screen 101 (step S3). Namely, as shown in FIG. 14(d), the photograph having been subjected to trimming is disposed at an arbitrary position within a layout area 111 showing the entire surface of a leaflet, a catalog or the like. The layout position of the photograph having been subjected to trimming is indicated by a contour line 112. At the side of the layout area 111, an operation menu panel 113 and reduced patterns 114 are displayed. Inputting is effected by the coordinate input unit 102 in the same manner as the trimming operation. For instance, in the case of laying out a mountain pattern as shown in FIG. 14(d), first is to move the cursor on the reduced patterns 114 to select the mountain pattern. The reduced patterns 114 are patterns indicating reduced images of a plurality of trimming patterns memorized in the large capacity magnetic disk 105 by the trimming work at the step S2. A pattern which will be subjected to laying out from now is selected from the reduced patterns 114. A contour line 112 of the selected patterns is displayed within the layout area. The operation menu panel 113 has display functions for expansion, reduction, rotation, registration, etc. By selecting a desired function using the cursor, layout is carried out. By making use of the expansion, reduction and rotation functions, an operator can lay out a photograph so that it has an arbitrary size and is directed in an arbitrary direction. Further, since the countour line 112 of the photograph is displayed on the layout area 111 with the photograph having the actual size and being directed in the actual direction, the operator can confirm the layout position at a glance, thus realizing an optimum layout. In addition, since only the contour line of the photographic pattern subject to laying out is displayed, the layout can be carried out while effecting a smooth interactive input having very fast response speed. Upon determination of the final layout position, when registration function is selected from the functions of the operation menu panel 113, the photographic pattern subject to laying out is registered at the present registration position and is memorized into the large capacity magnetic disk 105. At the same time, a color photographic data 112' is displayed on the portion at which only the contour line has been displayed from now as shown in FIG. 14(e) (it is not required to necessarily display the color photographic data 112' on the display).

When the layout of all the photographs has been completed in this way, an image is output at step S4. In this embodiment, a hard copy of the layout area 111 within the monitor screen 101 is output to the graphic printer 106. By visually confirming this hard copy output, proofreading the final layout is conducted. If modification is required, laying out on the monitor screen 101 is carried out again. This process corresponds to the process for checking hard copy output image 23 in FIGS. 10 and 11. When proofreading is completed, outputting is conducted to the color scanner 07 in the form of the film per each photograph using data which have been input at process 20 and not have trimmed (the process 25 for outputting separation films in FIG. 10). At this time, it should be conducted to produce an output multiplied by magnification in consideration of the size at the time of layout. By patching films thus output, separation films are prepared (the process 14 for preparing separation films dispatched in FIG. 10). Additionally, when the color scanner 107 is comprised of a unit provided with a large and high precision drum scanner, films corresponding to one screen of the layout area 111 may be output as they are instead of providing a film output with respect to each photograph, thus to use them as separation films. In this case, the process for patching films is not required.

Thus, the layout of photographs can be easily carried out by high response interactive input and outputting becomes possible in the form of the film, with the result that the process for preparing press plates and the printing process can be successively carried out without requiring any other additional process.

As stated above, a method of laying out photographs for leaflets, catalogs or the like according to this embodiment is characterized by trimming photographs having been input as digital data to display only their contour lines on the graphic display, thus to conduct layout. Accordingly, this enables layout by high response interactive input, resulting in realization of high efficiency layout.

An Embodiment Relating to the Method of Laying Out Characters

Figure 15:
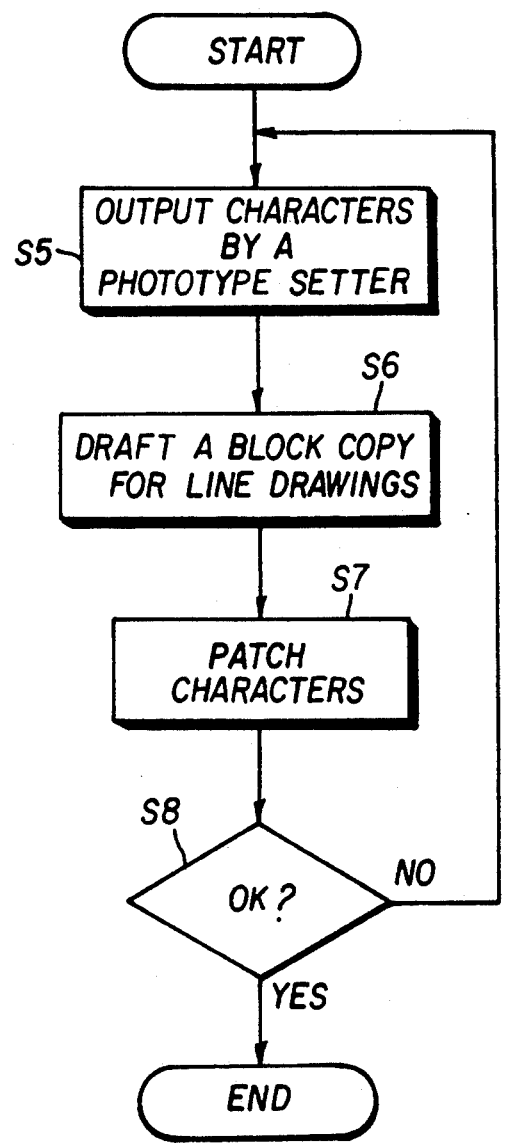
FIG. 15 is a flowchart showing a conventional method of laying out characters.
Figure 16A:
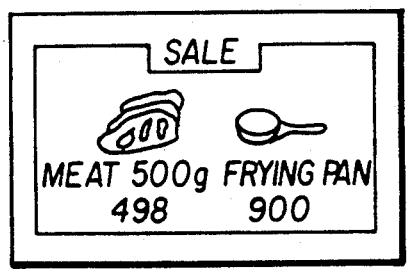
FIGS. 16(a) to (e) are explanatory views showing the middle stages in the process for printing leaflets.
Figure 16B:
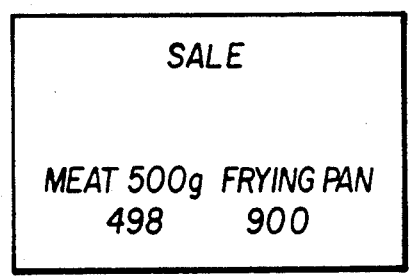
Figure 16C:
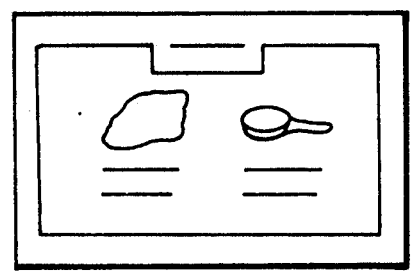

As described in the background art, printing of leaflets has been carried out in the art in accordance with the working process as shown in FIG. 1. The procedure relating to the layout of characters in this working process is expressed as the flowchart in FIG. 15. With a view to preparing a leaflet as shown in FIG. 16(a), attention is now drawn to a conventional method of laying out characters. Namely, characters must be subjected to laying out in the form as shown in FIG. 16(b). First, a character output is provided by the phototype setter at step S5 of the flowchart in FIG. 15. This is a work to print words, e.g., "sale", "meat 500 gr." etc. Subsequently, at step S6, drafting a block copy for line drawings is carried out. This is a block copy indicating layout positions of line drawings, photographs and characters for the leaflet as shown in FIG. 16(c). Then, at step S7, a work for patching characters having been printed at step S5 on the block copy is carried out. Actually, photographs are simultaneously patched at this time. When patching is completed, proofreading the patched articles is implemented at step S8. Ordinarily, at this stage, it often happens that modification is applied to the contents, positions and sizes of characters. If modification is required, the procedure from the step S5 will be repeated for a second time.

As just described above, the conventional method of laying out characters manually executes works for outputting characters, drafting a block copy for line drawings and patching characters. When modification is required at the time of proofreading, the layout work must be repeated from the first, resulting in very poor efficiency.

Figure 17:
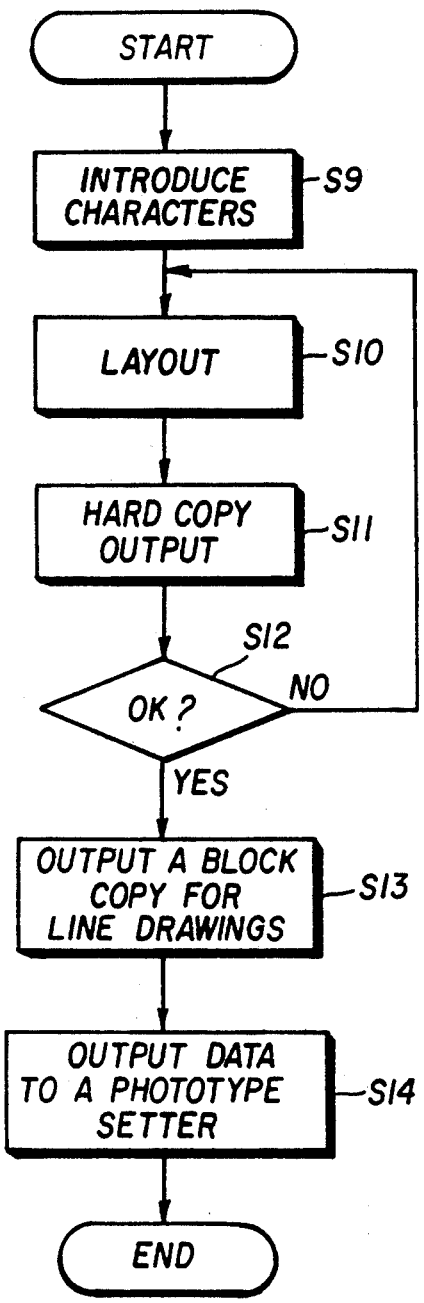
FIG. 17 is a flowchart showing a method of laying out characters according to the present invention.
Figure 18:
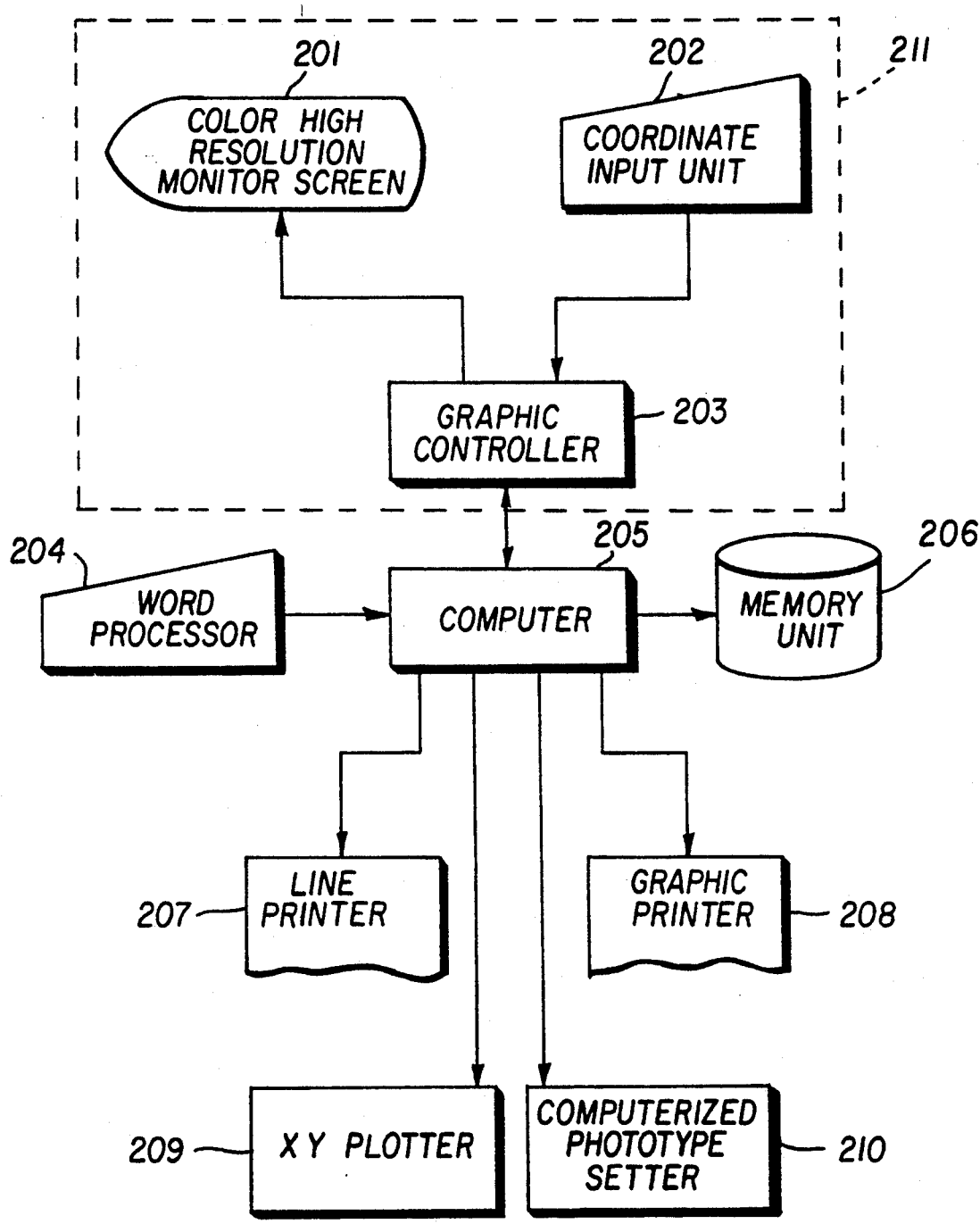
FIG. 18 is a block diagram showing an embodiment of an arrangement of a layout device for carrying out the method of laying out characters shown in FIG. 17.

An embodiment which will be described in detail below has solved such a problem and provides a method of laying out characters which is capable of carrying out a high efficiency layout of characters using a computer. FIG. 17 is a flowchart of a laying out method according to this embodiment and FIG. 18 is a block diagram showing an arrangement of an embodiment of a layout device for carrying out this method. First, at step S9 in FIG. 17, characters to be subject to laying out are introduced into the memory unit as digital data. This may be accomplished by generating character codes using a word processor 204, causing them to be memorized into a memory unit 206 through a computer 205 as shown in FIG. 18 (corresponding to the process for inputting through word processor 21 in FIGS. 10 and 11). In the case of the leaflet as shown in FIG. 16(a), characters, e.g., "sale", "meat 500 gr." etc. are input from the word processor 204. Thus, trade name, description of goods, model number, quality of the material, price, propaganda phrase, commentary etc. are input. By using the word processor, a series of character codes are memorized into the memory unit 206. Additionally, such character data may be taken in by a customer's word processor. In this case a memory medium such as a flexible or floppy disk is received from the customer at the time of accepting an order for printing leaflets. Thus the character data in the received medium is transferred to the memory unit 206.

Figure 16D:
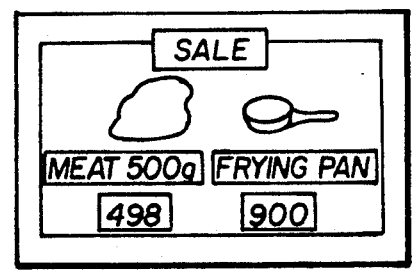
Figure 16E:
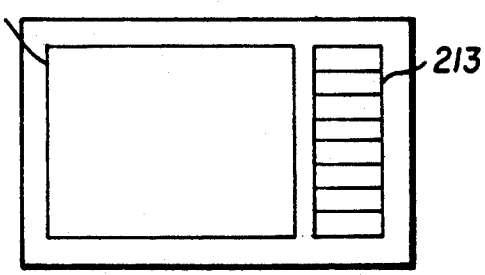

Subsequently, at step S10, the layout of characters taken in is carried out on the color high resolution monitor screen 201 (corresponding to the process for laying out on a monitor screen 22 in FIGS. 10 and 11). When the character font data base is prepared in advance within the memory unit 206, a character font corresponding to a character subject to laying out is transferred to the monitor 201 through the computer 205 and the graphic controller 203. Thus, the character is displayed on the monitor 201. The inputting operation relating to the layout of characters is carried out by the coordinate input unit 202. Namely, the color high resolution monitor 201, the coordinate input unit 202 and the graphic controller 203 constitute an interactive input device 211. Thus, an operator can operate the coordinate input unit 202 while observing the monitor 201 to carry out interactive laying out work. The screen of the monitor 201 is composed of a layout area 212 indicating the entire surface of a leaflet, a catalog or the like and an operation menu panel 213 as shown in FIG. 16(e). On the operation menu panel 213, some characters subject to laying out are displayed and layout commands, e.g., expansion, reduction, rotation, type style designation, line feed etc. are also displayed. The operator selects a character subject to laying out work from the operation menu panel to designate a desired command to execute layout. The layout information is memorized into the memory unit 206 in the form of the layout table as shown in FIG. 19. In the example of this layout table, character number (No.), character code, position, size, type style, space between characters, distortion ratio, rotation, color etc. are designated with respect to characters subject to laying out. For the character code, ASCII code is used and coordinate values on the layout area 212 are used for position. For the size, point values indicating the sizes of printing-type are given by the expansion and/or reduction commands. For the style of the type, codes indicating e.g., italic type, bold type, Gothic type etc. are given. For the space between characters, values indicating spacings between respective characters are given. The distortion ratio is a parameter for setting the distorted form of the character which is expressed by three elements of oblique style, elongated style and flat style to which percent values are given. The rotation is a parameter indicating the direction of character to which an angular value is given. The color is a parameter for representing the color of character with a mixing ratio of four elements of yellow (Y), magenta (M), cyanogen (C) and black ($B_L$). An operator inputs the above various elements using the coordinate input unit 202. The layout result can be confirmed at once by the monitor 201.

When the layout of all characters is completed, hard copy output is produced at step S11. This is accomplished by outputting an image of the layout area 212 to the graphic printer 208. The computer 205 retrives character font data in the memory unit 206 on the basis of the above-described layout table to output a print command to the graphic printer 208. The operator has this hard copy in his hand to conduct proofreading at step S12. If there is any portion to be modified, the operation is carried out over again from the step for laying out at step S10 (corresponding to the process 23 for checking hard copy output image in FIGS. 10 and 11). It is to be noted that such a modification is sufficiently executed by a work for only making modification of data on the monitor screen 201, viz., a manual work such as to redraft a block copy for line drawings to patch characters is not required.

When proofreading is completed, outputting a block copy for line drawings is performed at step S13. This is accomplished by allowing the computer 205 to deliver data indicative of a block copy for line drawings to an XY plotter 209. A block copy for line drawings as shown in FIG. 16(c) is automatically drafted by the XY plotter 209 (corresponding to the process 24 for automatically outputting a block copy for line drawings in FIG. 10).

Then, at step S14, an output delivered to the phototype setter is produced. In this process, the execution using the manual phototype setter is somewhat different from that using the computerized phototype setter. In the former case, data is output to the line printer 207 (which corresponds to the process 26 for automatically outputting phototype instruction in FIG. 10). The data output in this case are data serving as a specification for typing the manual phototype setter and they are data indicative of printing characters, style of type, point value, pitch etc. The operator manually carries out phototype setting on the basis of the specification (which corresponds to the process for manual phototype setting 8 in FIG. 10) to patch printed characters at predetermined positions in a block copy for line drawings outputted at step S13 to prepare a block copy for characters as shown in FIG. 16(d) (which corresponds to the process for preparing a block copy for characters 9 in FIG. 10). On the other hand, in the latter case, the process at step S14 is carried out simultaneously with the process at step S13 (which corresponds to the process 28 for automatic outputting by a computerized phototype separation films in FIG. 11). Namely, data indicative of characters and line drawings are output to the computerized phototype setter 210. In this instance, it is sufficient to memorize a code table for computerized phototype setter into the memory unit 206 to retrive this code table on the basis of the layout information to offer a predetermined code to the computerized phototype setter 210, allowing it to effect printing. This code may be directly offered to the computerized phototype setter 210 through the computer 205, or may be offered to the computerized phototype setter 210 through a medium such as a floppy disk when the computerized phototype setter 210 is not connected directly to the computer 205. In a manner stated above, characters and line drawings are automatically output by the computerized phototype setter. Thus, a block copy for characters such that FIGS. 6 and 8 are superimposed is prepared.

Since the layout of characters is carried out in an interactive form using the coordinate input unit 202 while observing the monitor screen 201, the layout can be effected with high efficiency and modification can be also made with ease. In addition, since an output of a block copy for line drawings can be automatically produced and data delivered to the phototype setter can be automatically output, labor at the processes up to the preparation of a block copy for characters is lessened to a great extent.

As just described above, a method of laying out characters for leaflets, catalogs or the like according to this embodiment is characterized by laying out characters taken in as digital data on a graphic display by an interactive input to output data delivered to the block copy for line drawings and the phototype setter, thus making it possible to conduct a high efficiency layout.

An Embodiment Relating to the Method of Laying Out Figure

In the process described above as the best mode relating to the printing method, the layout of line drawings, photographs and characters is carried out on the display. In regard to the layout of figures (including line drawings, photographs, and characters), various techniques have been known in the art in accordance with the development of computers. In such a layout of figures, a position, a size and an angle which are subject to laying out must be determined. Generally, for determining the position, there are adopted a method of designating position coordinates using a coordinate input unit, a method of inputting position coordinate values from a keyboard and the like. In view of operability, the method of directly inputting positions using a digitizer etc. is superior to the method of inputting numerals from the keyboard. This is because an operator can designate positions in an analog fashion while observing the display screen. However, in regard to the determination of the size and the angle, no analog designation method was adopted in the prior art. Namely, relating to the size, there is employed a method of inputting values of integer (two or four times etc.) indicating magnification from a keyboard, or a method of selecting a desired magnification value from a menu indicating magnification even in the case of using a digitizer. In addition, relating to the angle, there is employed a method of inputting an angular value from a keyboard, or a method of selecting a desired angular value from a menu indicating angles even in the case of using a digitizer. Accordingly, in regard to determination of the size and the angle, the drawback with the conventional methods is that operability is very poor.

An embodiment which will be described in detail has solved such problems and provides a method of laying out figures which can input the size and the angle of the figure with good operability. When applied to the printing method according to the present invention, this method is utilized in the process for laying out line drawings, photographs and characters. The process for laying out figures on a commonly used display will be explained.

Attention is now drawn to the case that a FIG. 301 is subjected to laying out on a display 302 as shown in FIG. 20(a). As previously described, it is necessary for layout to determine the position, the size and the angle. Thus, the layout position is first designated by a digitizer. This may be accomplished by causing a closed area for positional designation of the digitizer to be in correspondence with the screen of the display 302 with one-to-one relationship, whereby when a point within the closed area for positional designation of the digitizer is designated, the FIG. 301 is subjected to laying out at a position on the display 302 corresponding to the designated point. By designating coordinates at point P using the digitizer such as shown in FIG. 20(a), the layout position is determined.

Then, the designation of size is executed. This is accomplished by providing a closed area for designation of size and a size reference line dividing this area into two subareas to designate a point. A preferred embodiment of the closed area 303 for designation of size is shown in FIG. 20(b). This closed area is triangular and is divided by the size reference line AA'. The closed subarea above the size reference line AA' is used for designating expansion, and the closed subarea therebelow is used for designating reduction. The size is determined depending upon a distance between a designated point within either subarea and the size reference line AA'. In this embodiment, a magnification proportional to distance is designated. For example, when coordinates at a point b on the line BB' are designated by the digitizer, the magnification of $\alpha$ times ($\alpha > 1$) is designated, when coordinates at a point c on the line CC' are designated, the magnification of $\beta$ times ($\beta > 1$) is designated, and when coordinates at a point d on the line DD' is designated, the magnification of $\gamma$ times ($\gamma < 1$) is designated. These magnifications are multiplied by the size of the figure currently displayed on the display. For instance, when an input for designating the point b is given to the figure which has been indicated at first with magnification of one time, the figure having been enlarged with magnification of $\alpha$ times is displayed. Subsequently, when an input for designating the point c is further given, the figure having been enlarged with magnification of $\alpha \times \beta$ times is displayed. As described above, it is sufficient for an operator to always judge that the figure displayed on the display should be enlarged or reduced to designate a predetermined position within the closed area 303 in accordance with the judgement. Points on the size reference lines AA' represent positions of equimultiple. According as the position is shifted toward the upward direction, magnification becomes large. In contrast, according as the position is shifted toward the downward direction, magnification becomes small. In this embodiment, since the closed area 303 is triangular, subareas of the closed area 303 positioned above have broader width. Thus, an operator can obtain the criterion of magnification from the width. In addition, since there is employed the system to designate a point within the closed area, inputting is possible in an analog fashion, resulting in realization of layout input having good operability.

Subsequently, designation of angle is carried out. This is accomplished by providing a closed area for designation of angle, an origin and an angular reference line passing through the origin in the digitizer to designate a point with the closed area for designation of angle. A preferred embodiment of a closed area 304 for designation of angle is shown in FIG. 20(c). This closed area 304 is semicircular. The central point of the semicircle serves as the origin O. An angular reference line OD connecting the origin O to a point D on the circumference serves as a radius of the semicircle. The angle is determined in dependence upon an angle defined by a straight line connecting a designated point within the closed area 304 and the angular reference line OD. In this embodiment, the angle thus determined is used as an angle for rotation of the figure as it is. For instance, when a clockwise angle with respect to the angular reference line OD is taken as a positive angle, coordinates at a point e are designated by the digitizer as shown in FIG. 20(c), each $\theta$ defined by the angular reference line OD and the radius OE is designated. Thus, the figure currently displayed on the display will be displayed with it being rotated by the angle $\theta$. Further, when the point e is designated successively twice, rotation of $2\theta$ is obtained in total. As described above, it is sufficient for an operator to always judge that the figure displayed on the display should be rotated in clockwise or counterclockwise direction to designate a predetermined position within the closed area 304 in accordance with the judgement. Points on the angular reference line OD represent positions indicating no rotation. When advancing to the right, clockwise rotation is obtained, while when advancing to the left, counterclockwise rotation is obtained. Thus, an operator can designate the magnitude of a rotational angle as a criterion of the position on the semicircular closed area 304. In addition, since there is employed the system to designate a point within the closed area, inputting is possible in an analog fashion, resulting in realization of layout input having good operability.

In the above-mentioned embodiment, the example for laying out line drawings as the figure has been explained. Laying out characters or photographs as the figure can be carried out in the same manner.

As just described above, a method of laying out figures according to this embodiment is characterized in that the coordinate input unit is used to provide a function of providing a layout input on the graphic display in an analog fashion, thus enabling layout having good operability.

An Embodiment Relating to the Method of Designating Colors on a Display

In the working process which has been previously described as the best mode relating to the printing method, the layout of line drawings, photographs and characters is carried out on the display. In addition, coloring applied thereto, i.e., color designation is also executed on the display. According as computers have been developed, various methods have become known in connection with such a coloring method on a display. In general, a method of representing a color as a mixture of several reference colors is adopted. Particularly, for printed matters, yellow (Y), magenta (M), cyanogen (C) and black ($B_L$) are taken as reference colors, and they are represented as mixture of these colors. In accordance with the conventional color designation method, the mixing ratio of Y, M, C and $B_L$ was given as a numerical value. For instance, in the case of the inputting system using a keyboard, each numerical value is input using numeric keys. Further, in the case of the inputting system using a digitizer, each numerical value is input using a numeric menu. However, such methods of designating colors based on the numerical value have the drawback that operability is poor. The determination of mixing ratio of respective reference colors for obtaining a desired color is greatly dependent upon skillfulness of an operator. Thus, it was very difficult to precisely a desired color.

In addition, it was unable to confirm an actual color tone of a designated color until printing was completed. Only a confirmation to such an extent of estimating the color tone was possible during color designating operation.

An embodiment which will be described in detail below has solved such problems and provides a method of designating a color on a display which can easily confirm an actual color tone and carries out color designation having good operability.

Figure 21:
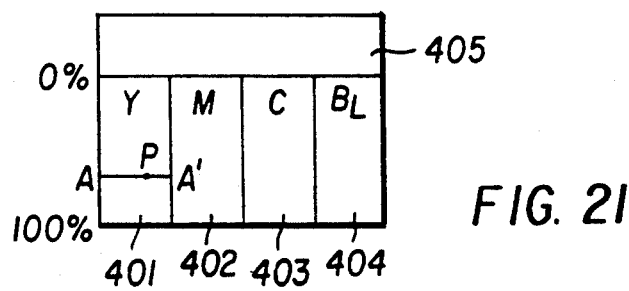
FIG. 21 is a view showing a menu panel used for a color designation method according to the present invention.
Figure 22:
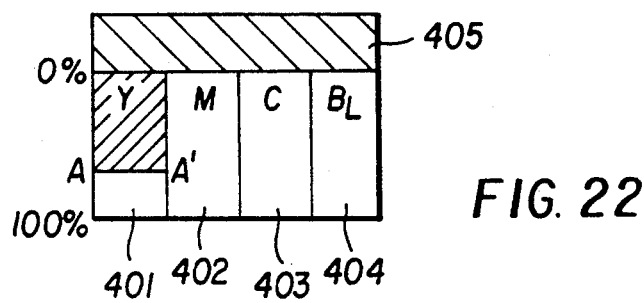
FIG. 22 is a view showing the above-mentioned menu panel when color designation is being carried out.

FIG. 21 is a view illustrating one example of a menu panel used in a method according to the present invention. In this example, the color on the display is represented as mixture of four reference colors of Y, M, C and $B_L$ and reference color display areas 401 to 404 are provided for the reference colors, respectively. Above these areas, a designated color display area 405 is provided. An arbitrary point within each of areas 401 to 404 of the menu panel can be freely designated by the digitizer. Graduations of 0 to 100% are given to each of reference color display areas 401 to 404 from top to bottom and they correspond to the density ratios of respective colors. When attention is drawn to the case of designating the density ratio of the reference color Y, this may be accomplished by designating a point P using the digitizer as shown in FIG. 21. The same density ratio can be also obtained by designating any other point on the line AA' except for the point P. When the density ratio has been designated, a portion having an area proportional to the designated density ratio of the reference color display area is colored by the reference color. For example, when the point P is designated in FIG. 21, a hatched portion of the reference color display area 401 in FIG. 22 is colored yellow. Besides, the density of yellow is based on the designated density ratio. Namely, according as the density ratio increases from 0 to 100%, the density becomes thicker. In a manner similar to the above, respective density ratios of M, C and $B_L$ are designated. Thus, a designated color obtained by mixing reference colors in accordance with the designated density ratio is displayed on the designated color display area 405.

Figure 23:
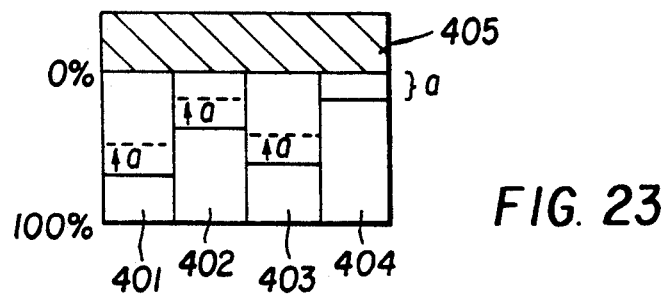
FIG. 23 is a view showing the above-mentioned menu panel when UCR (Unclear Color Removal) is automatically performed.

As previously described, four colors of Y, M, C and $B_L$ are generally used for the printed matters. In the case of designating $B_L$ among them, the technique called UCR (Under Color Removal) is used in actual printing processes. In accordance with this technique which is peculiar to the printing art, when the density ratio of $B_L$ is designated as $\alpha$, respective density ratios of Y, M and C are reduced by $\alpha$. Thus, it is convenient to have a function to automatically perform this UCR. In the case where after three density ratios of Y, M and C have been designated, the density ratio of $B_L$ is designated as $\alpha$ such as shown in FIG. 23, it is sufficient to reduce respective ratios of Y, M and C by $\alpha$ to provide ratios shown by broken lines.

Figure 24:
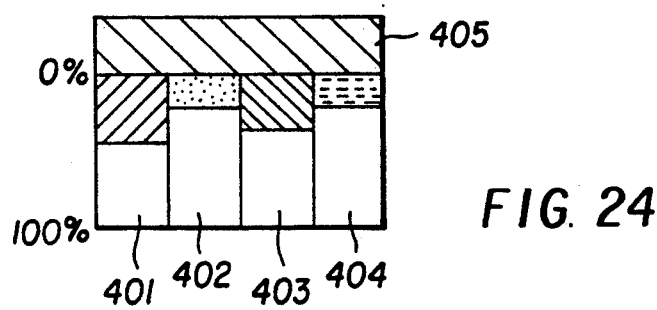
FIG. 24 is a view showing the above-mentioned menu panel after color designation has been completed.

FIG. 24 shows the condition of the menu panel after color designation has been completed. Since the density ratios of respective colors of Y, M, C and $B_L$ are displayed in the form of a segmented bar chart, the mixing ratio of reference colors can be readily grasped by intuition. Since particularly a designer can grasp this segmented bar chart with it being replaced with an amount of a pigment, he can easily designate a desired color. Moreover, since a designated color itself obtained by mixing these reference colors is displayed on the designated color display area 405, it is possible to confirm an actual color on the spot. In addition, since the designation of the density ratio is not based on the system of inputting with the numerical value, but is based on the system of designating a point within the reference color display area, inputting is possible in an analog fashion, resulting in very excellent operability.

As stated above, a method of designating a color on a display according to this embodiment is characterized by permitting the density ratio of respective reference colors to be input in an analog fashion to visually display the density ratio thus input and to display a mixed color, thus making it possible to confirm an actual color tone and to carry out color designation having good operability.

Industrial applicability

A method of printing leaflets, catalogs or the like according to the present invention can be widely utilized in the printing field for leaflets, catalogs, posters, magazines, books etc., viz., the printed matters on which characters, photographs or line drawings are printed.

Moreover, a method of laying out characters, a method of laying out photographs, and a method of laying out figures according to the present invention can be widely utilized not only for the layout carried out in the process for printing leaflets, catalogs or the like, but also for the layout on a display in the field of the general image processing using a computer.

In addition, a method of designating colors according to the present invention can be widely utilized not only for color designation in the process for printing leaflets, catalogs or the like, but also for color designation on a display in the field of the general image processing using a computer.

We claim:

1. A method of laying out an object for leaflets, catalogs or the like, at a predetermined position, using a computer with a graphic display, the method comprising the steps of:

preparing a coordinate system on said graphic display;

providing a closed area for designating size and a size reference line dividing said closed area into two closed parts on said coordinate system; and designating a point within said closed area to determine a size for layout depending upon a distance between said designated point and said size reference line;

wherein one of the two closed parts is used for designation of expansion, and the other one of the two closed parts is used for designation of reduction.

2. A method of laying out an object for leaflets, catalogs or the like, at a predetermined position in a predetermined direction, using a computer with a graphic display, the method comprising the steps of:

preparing a coordinate system on said graphic display;

providing a closed area for designating a direction, an origin, and an angular reference line passing through said origin on said coordinate system; and designating a point within said closed area so as to determine a layout direction depending upon an angle defined by a straight line connecting said designated point to said origin and said angular reference line.

3. A method of laying out an object for leaflets, catalogs or the like, using a computer with a graphic display, the method comprising the steps of:

providing n reference color display areas and a single designated color display area on said graphic display;

designating a point within each of said respective reference color display areas using an XY-coordinate input unit and determining density ratios of said respective reference colors based on coordinate values which indicate locations of each designated point;

displaying portions corresponding to said density ratios among said reference color display areas with said reference colors; and displaying said designated color display area with a designated color obtained by mixing said reference colors in accordance with said density ratios.

* * * * *